(12) United States Patent
Frisch et al.

(10) Patent No.: US 11,044,901 B2
(45) Date of Patent: Jun. 29, 2021

(54) DOME-COVERED RODENT TRAP

(71) Applicant: AP&G Co., Inc., Brooklyn, NY (US)

(72) Inventors: Jeffrey Frisch, Lawrence, NY (US); Jonathan Frisch, Cedarhurst, NY (US); Peter Chung, Palasades Park, NJ (US); Zack Kowalksi, Manhattan, NY (US); Marco Perry, Brooklyn, NY (US)

( * ) Notice: Subject to any disclaimer, the term of this patent is extended or adjusted under 35 U.S.C. 154(b) by 0 days.

(21) Appl. No.: 15/530,177

(22) Filed: Dec. 8, 2016

(65) Prior Publication Data
US 2017/0156308 A1  Jun. 8, 2017

Related U.S. Application Data

(60) Provisional application No. 62/264,556, filed on Dec. 8, 2015.

(51) Int. Cl.
*A01M 23/30* (2006.01)
*A01M 23/22* (2006.01)

(52) U.S. Cl.
CPC ............ *A01M 23/30* (2013.01); *A01M 23/22* (2013.01)

(58) Field of Classification Search
CPC ...... A01M 23/02; A01M 23/08; A01M 23/16; A01M 23/22; A01M 23/24; A01M 23/30
USPC .................................................. 43/60–63, 81
See application file for complete search history.

(56) References Cited

U.S. PATENT DOCUMENTS

| | | | | |
|---|---|---|---|---|
| 1,466,602 A * | 8/1923 | Savicks | ................. | A01M 23/20 43/61 |
| 1,587,536 A * | 6/1926 | Lobit | .................... | A01M 23/24 43/61 |
| 2,803,918 A * | 8/1957 | Hall | ....................... | A01M 23/22 43/61 |
| 4,393,616 A * | 7/1983 | Kaufman | .............. | A01M 23/18 43/60 |
| 4,858,373 A * | 8/1989 | Combs | .................. | A01M 23/22 43/61 |
| 5,148,624 A * | 9/1992 | Schmidt | ................ | A01M 23/30 43/81 |
| 5,172,512 A * | 12/1992 | Bodker | ................. | A01M 23/30 43/81 |
| 5,588,249 A * | 12/1996 | Flinner | ................. | A01M 23/20 43/61 |
| 5,746,020 A * | 5/1998 | Fiore, Jr. | ............... | A01M 23/24 43/85 |
| 6,508,031 B1 * | 1/2003 | Johnson | ................ | A01M 23/30 43/83.5 |
| 6,539,663 B2 * | 4/2003 | Mosher | ................. | A01M 23/22 43/58 |
| 6,684,560 B2 * | 2/2004 | Lafforthun | ............ | A01M 23/16 43/61 |
| 7,980,023 B2 * | 7/2011 | Nelson | ................ | A01M 25/004 43/114 |

(Continued)

*Primary Examiner* — Lisa L Tsang
(74) *Attorney, Agent, or Firm* — Tarter Krinsky & Drogin LLP (57) ABSTRACT

A dome-covered rodent trap for capturing rodents. The trap has a base formed of walls and two openings through which rodents may enter. A snap mechanism for trapping rodents is secured to the base. A movable dome also is attached to the base. When the trap is set, the movable dome is maintained in a raised position. However, when the snap mechanism is triggered by a rodent, the movable dome moves downward to cover the base—thereby forming a sealed container around a captured rodent.

9 Claims, 12 Drawing Sheets

(56) References Cited

U.S. PATENT DOCUMENTS

| | | | | |
|---|---|---|---|---|
| 8,146,289 B2* | 4/2012 | Gauker | ............... | A01M 23/30 |
| | | | | 43/61 |
| 8,490,323 B2* | 7/2013 | Nathan | ............... | A01M 23/24 |
| | | | | 43/77 |
| 2003/0110679 A1* | 6/2003 | Collins | ............... | A01M 23/30 |
| | | | | 43/81 |
| 2009/0249680 A1* | 10/2009 | Watson | ............... | A01M 23/30 |
| | | | | 43/81 |
| 2012/0167449 A1* | 7/2012 | Frisch | ................. | A01M 23/30 |
| | | | | 43/81 |
| 2012/0180378 A1* | 7/2012 | Studer | ................. | A01M 23/08 |
| | | | | 43/60 |

* cited by examiner

DOME-COVERED RODENT TRAP

RELATED APPLICATIONS

This application claims priority of U.S. Provisional Patent Appl. Ser. No. 62/264,556 filed Dec. 8, 2015—the contents of which are incorporated by reference herein.

FIELD OF THE INVENTION

The invention relates to the field of rodent abatement, more specifically to a rodent trap having an interior chamber for catching a rodent and an upper dome that is lowered to conceal a trapped rodent.

BACKGROUND OF THE INVENTION

Rodent traps are routinely used in residential and commercial settings. Commonly used trapping devices include mechanical traps and glue boards. One problem associated with many of such common traps is that the sight of a caught rodent is unpleasant and objectionable to many users.

SUMMARY OF THE INVENTION

The invention set forth herein is a rodent trap having a base member and a dome member that is positioned above of the base member. A snap mechanism mounted to the base member is used to trap rodents. Once the snap mechanism is activated by a rodent, the dome member automatically moves downward to cover the base member and the captured rodent. An indicator on the top surface of the trap notifies a user that a rodent has been caught inside the trap. As such, a user does not see or encounter a trapped rodent.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

DETAILED DESCRIPTION OF THE INVENTION

The rodent trap in embodiment of the invention has snap mechanism including a movable jaw that is supported by a lower base member and which also contacts an upper dome member. When the snap mechanism is activated (e.g. when triggered by a rodent), the upper jaw snaps down to capture the rodent and the associated dome lowers over the base member. As a result, the snap mechanism and the rodent caught therewithin are concealed by the dome and out the view of a user. An indicator on the outside surface of the dome notifies a user that the trap has been activated and a rodent is caught.

Figure 1:
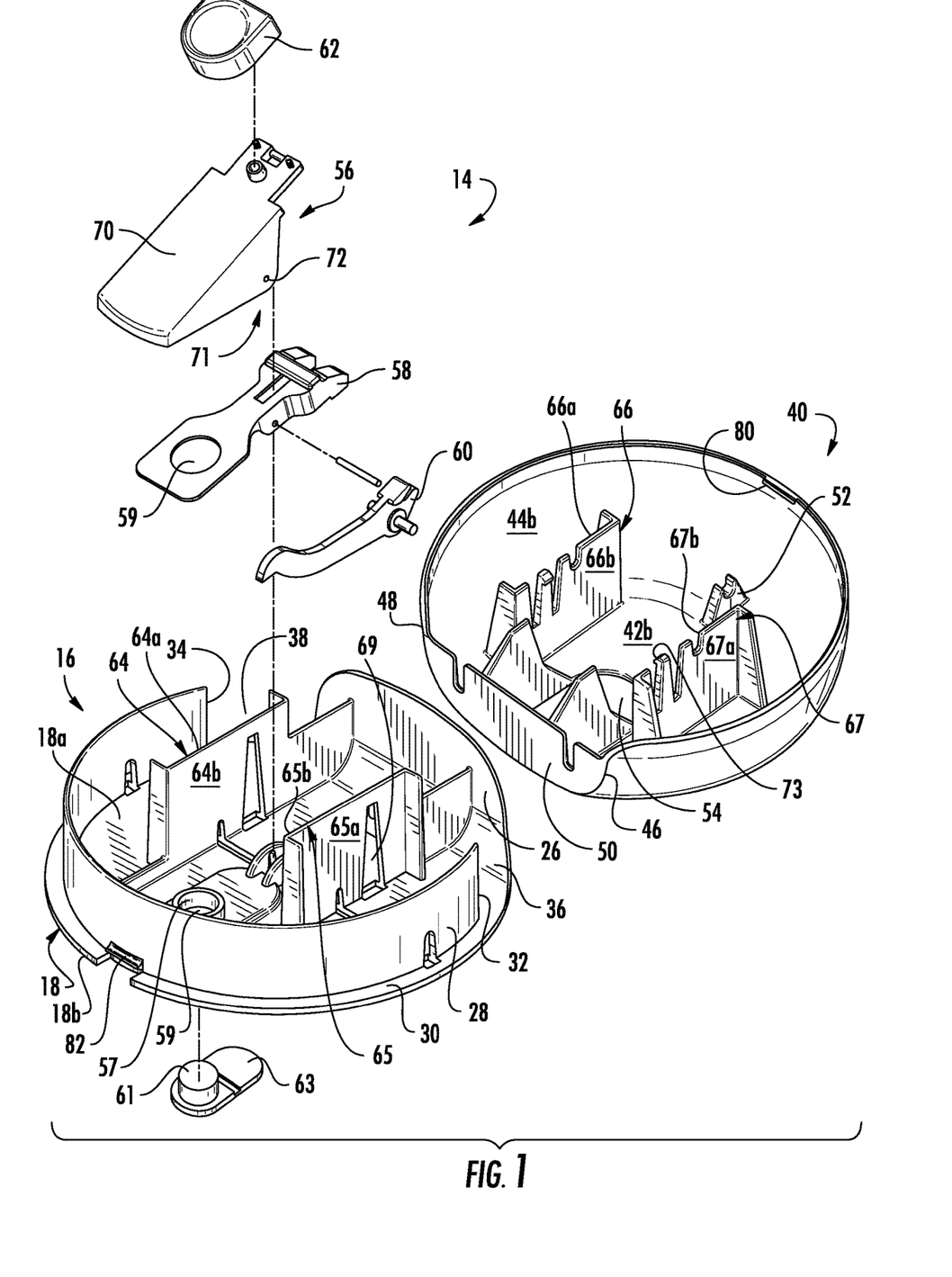
FIG. 1 is an exploded view of a rodent trap according to an exemplary embodiment of the invention.

FIG. 1 shows an exploded view of a rodent trap 14 according to an embodiment of the invention. As shown, a lower base member 16 supports the snap mechanism according to an embodiment of the invention. Base member 16, is a generally round unit having a substantially flat lower base plate 18. Base plate 18 has an upper surface 18a and an underside surface 18b. Upper surface 18a of base plate 18 forms the interior floor of the rodent trap, and underside surface 18b (best shown in FIG. 7) is a substantially flat planar surface that rests on the floor or similar surface.

Figure 2:
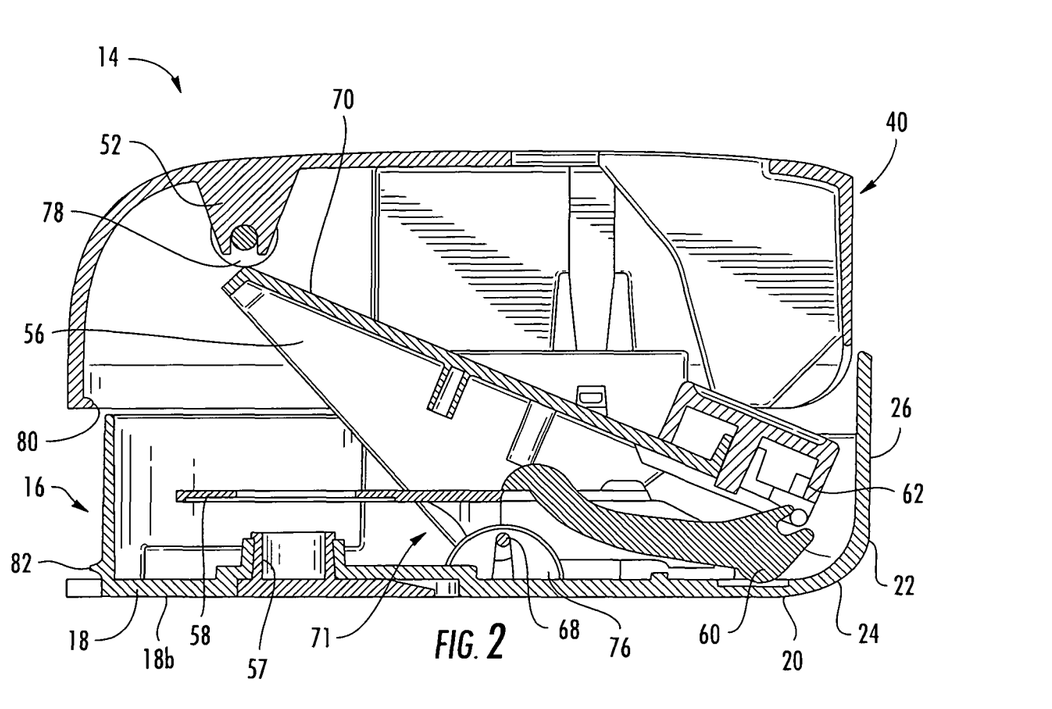
FIG. 2 is a side cross-sectional view taken through plane "A-A" of the rodent trap of FIG. 5 according to an exemplary embodiment of the invention.

In embodiments of the invention, base plate 18 may be substantially circular in shape. In other embodiments of the invention, and as shown in FIG. 1, base plate 18 is not completely circular in shape—but rather it forms an incomplete circle. For example, referring to FIG. 7 at a first location (e.g. 20), base plate 18 begins to curve upward (toward the top of the rodent trap 14 when oriented as in FIG. 2) forming a curved segment 24. In embodiments of the invention, and as shown in FIG. 2, curved segment 24 terminates at a second position that is substantially orthogonal to base plate 18. As shown, a flat wall 26 extends upwardly from curved segment 24. In embodiments of the invention, flat wall 26 is disposed substantially orthogonally to base plate 18. Front flat wall 26 of base member 16 has an outside surface that contacts a wall when the trap 14 is deployed to trap rodents. An inside surface of flat wall 26 forms a part of the inner housing of trap 14.

Referring to FIG. 1, a rounded wall 28 is shown extending upwardly from upper surface 18a of base plate 18. Rounded wall 28 is an outer wall that may extend from the perimeter of based plate 18, but in embodiments of the invention, rounded wall 28 extends from upper surface 18a in an area that is offset from the perimeter of base plate 18. For example, as shown, an outer peripheral area 30 of upper surface 18a of base plate 18 surrounds rounded wall 28. Thus, rounded wall 28 is offset from the outer perimeter of base plate 18 by the width of peripheral area 30. In embodiments of the invention, and as shown, rounded wall 28 does not extend for a sufficient distance to form a complete ring. Rather, rounded wall 28 terminates at a first end wall 32 and a second end wall 34. As shown, a first opening 36 is disposed between first end wall 32 of rounded wall 28 and flat wall 26, and a second opening 38 is disposed between a second end wall 34 of rounded wall 28 and rear wall 26. Openings 36, 38 are spaces through which rodents may ingress into the inner housing of trap 14.

FIG. 1 also shows a perspective bottom view of a cooperating dome 40 according to an embodiment of the invention. Dome 40 has a substantially flat roof plate 42 and an annular edge 44 descending downward therefrom. Roof plate 42 has an outer surface 42a (e.g. shown in FIG. 5) and an underside surface 42b (shown in FIG. 1). Annular edge has an outside surface (44a shown in FIG. 5) and an inside surface 44b (shown in FIG. 1).

Annular edge 44 may be a rounded wall or rim, however, in embodiments of the invention, annular edge 44 does not form a complete circular ring. Rather, a first end 46 and a second end 48 of annular edge 44 is bridged by a flat wall segment 50. In embodiments of the invention, flat wall segment 50 of dome 40 is sized and shaped to align with front flat wall 26 of base 16 when dome 40 is lowered onto base member 16, as described in more detail below.

Referring to the bottom, perspective view of dome 40 shown in FIG. 1, underside surface 42b of roof plate 42 has a post 52 emanating therefrom or formed integrally therewith. Post 52 has a groove, pocket or similar structure for receiving an axle of a wheel.

In embodiments of the invention, a cutout 54 is made through the surface of roof plate 42 to allow an indicator to project therethrough when a rodent is caught.

In embodiments of the invention, cooperating guide walls are provided on base member 16 and dome 40 to attach dome 40 to base member. For example, as shown in FIG. 1, a first guide wall 64 and a substantially parallel second guide wall 65 are affixed to upper surface 18a of base plate and are disposed substantially orthogonally thereto. Guide wall 64 has an outside surface 64a that faces interior of rounded wall 28 and an inside surface 64b that faces second guide wall 65. Second guide wall 65 similarly has an outside surface 65a that faces interior of rounded wall 28 and an inside surface that faces first guide wall 64. A set of guide wall is also shown affixed to dome 40. As shown, a first guide wall 66 and a substantially parallel second guide wall 67 are affixed to underside surface 42b of roof plate 42 and are disposed substantially orthogonally thereto. Guide wall 66 has an outside surface 66a that faces inside surface 44b of annular edge 44 and an inside surface 66b that faces second guide wall 67. Second guide wall 67 similarly has an outside surface 67a that faces inside surface 44b of annular edge 44 and an inside surface 67b that faces first guide wall 66. In a preferred embodiment, the distance between first and second dome guide walls 66, 67 is incrementally greater than the distance between first and second base member guide walls 64, 65.

In embodiments of the invention, a slot 69 is made through a segment of each of guide walls 64 and 65. Slot 69 is an elongated opening made along the height of base member guide walls 64 and 65. Dome guide walls 66 and 67 are provided with hooks 73 that are sized and shaped to insert into respective slots on guide walls 64, 65.

In the process of assembling rodent traps 14, dome 44 is oriented face down (e.g. with underside surface 42b of roof plate 42 facing the base member 16) with annular edge 44 positioned above rounded wall 28 and flat wall 50 of dome positioned above flat wall 26 of base member 16. Dome 40 is then lowered onto base member 16 such that inside surfaces 66h, 67b of dome guide walls 66, 67 contact outside surface 64a, 64b of base member guide walls 64, 65. Hooks 73 insert into slots 69. In such configuration, dome 40 is maintained connected to and aligned with base member 16, yet movable upward and downward (e.g. in the z direction) with respect to base member 16. It will be understood that upward movement of dome 40 is limited by hooks 73 in slots 69. That is, hook 73 is prevented form moving upwardly past the top border of slot 69.

FIG. 1, also shows several components of the snap mechanism that are mounted to base member 16 in embodiments of the invention. For example, a jaw 56, a trigger plate 58 and a pawl 60 are shown. Also shown is a button 62 that is mounted to jaw. As described below, button 62 serves as an indicator alerting a user that a rodent has been caught.

Also shown in FIG. 1 a bait cup 57 is provided on the upper surface 18a of base plate 18. As shown, in an embodiment of the invention, bait cup 57 is a rounded collar or similar receptacle that holds bait materials. In embodiments of the invention, the bottom of bait cup 57 is an opening 59 (best shown in FIG. 8) through the base plate 18. A movable plug 61 attached to an extending leaf 63 removably inserts into opening 59.

Figure 5:
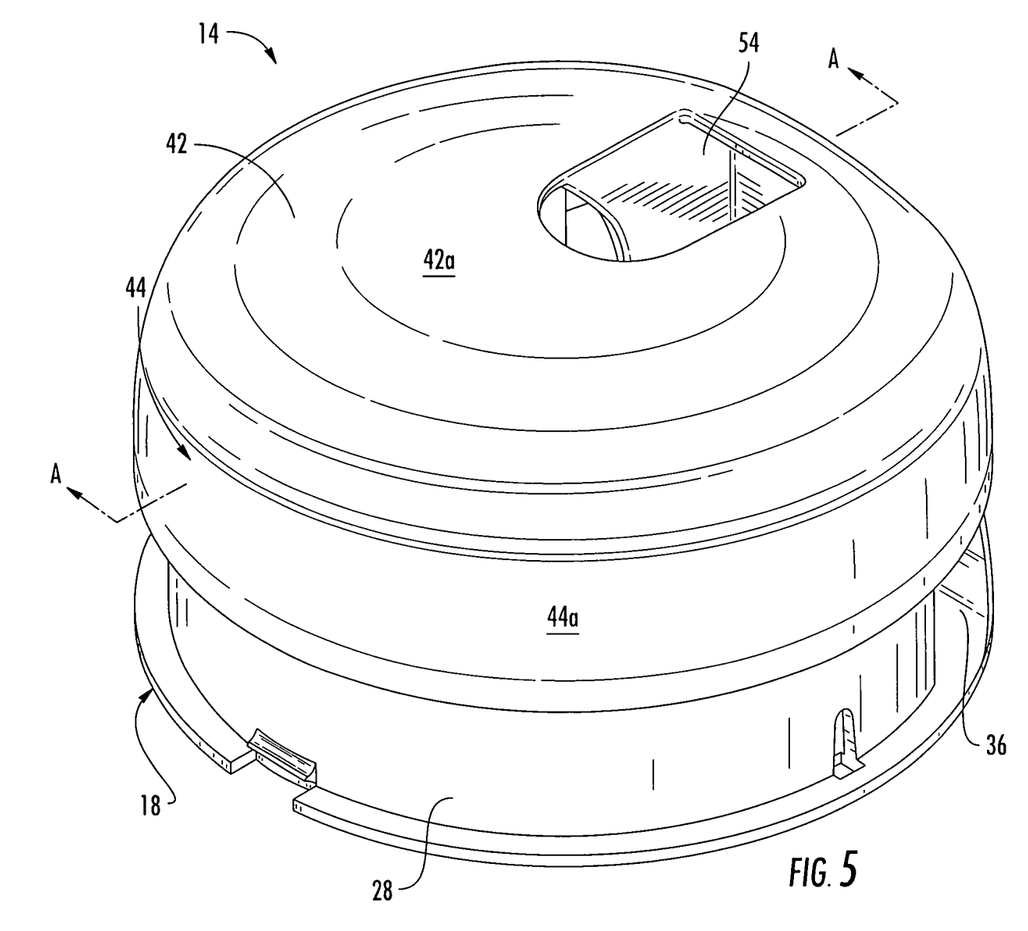
FIG. 5 is a top perspective view of a rodent trap in a "set" position according to an exemplary embodiment of the invention.

FIG. 2 shows a cross-sectional view taken through plane "A-A" of the rodent trap 14 shown in FIG. 5 according to an embodiment of the invention. A snap mechanism is shown mounted to the base plate 18 of base member 16. As shown, a spring-biased jaw 56 is used to snap down on a rodent. Jaw 56 is mounted to base plate 18 by way of a pivot 68 or axle. A spring or similar coil mounted below jaw 56 (not shown) generates an upward biasing force on the second end of jaw 56 when the trap is set as shown.

As shown, jaw 56 has a top planar surface 70 and an angled underside surface 71. Angled underside surface comes to an apex 72 (best shown in FIG. 1) that is off-centered with respect to the midpoint of planar surface 70. A hole 74 is shown near apex 72 for receiving pivot 68. As best shown in FIG. 2, a post 76 having a hole for receiving pivot 68 mounts jaw 56 to base plate 18 by the insertion of a pin or axle through post 76 and into hole 74 of jaw 56.

In a "set" position, a first end of jaw 56 is raised (e.g. the right end in the orientation shown in FIG. 2) and a second end of jaw is held by pawl 60 or similar lever. In the "set" position, the second end of jaw is biased upward by way of a spring (not shown)—however, pawl 60 maintains jaw 56 in a set positioned—overcoming the spring bias. Because of angled lower surface 71 of jaw 56, when the second end of jaw 56 (e.g. right in the orientation shown) is lowered, (i.e. held close to base plate 18), the opposite end thereof is raised. However, once pawl 60 disengages from jaw 56, the right end (in the orientation shown) of jaw 34 moves upward (due to the spring bias) and the left end thereof moves downward to trap a rodent. When trigger plate 58 is tripped by a rodent, it causes pawl 60 to disengage from jaw 56 and, as a result second end of jaw is forced upward and the first end of jaw 56 comes down on the rodent capturing the same.

Thus, FIG. 2 shows jaw 56 oriented in a "set" position with its left side raised and ready for snapping on a rodent. When jaw 56 is in this position, dome 40 rests on the end of jaw 56 that is raised (e.g. the left end) and dome 40 is thereby maintained in a raised position. When the trap is activated and jaw 56 snaps down on a rodent, however, dome 40 similarly moves downward.

In the embodiment shown in FIG. 2, a wheel 78 mounted to post 52 on the underside surface 42a of roof plate 42 rests on jaw 56. As such, when jaw 56 is lowered, wheel 78 rides down along the upper planar surface 70 of jaw 56 thereby lowering dome 40 over base 16. When dome 40 is fully lowered onto base member 16, its annular edge 44 surrounds and substantially captures rounded wall 28 and openings 36, 38. As such, a rodent that is trapped is completely obscured from view by dome 22.

Figure 3:
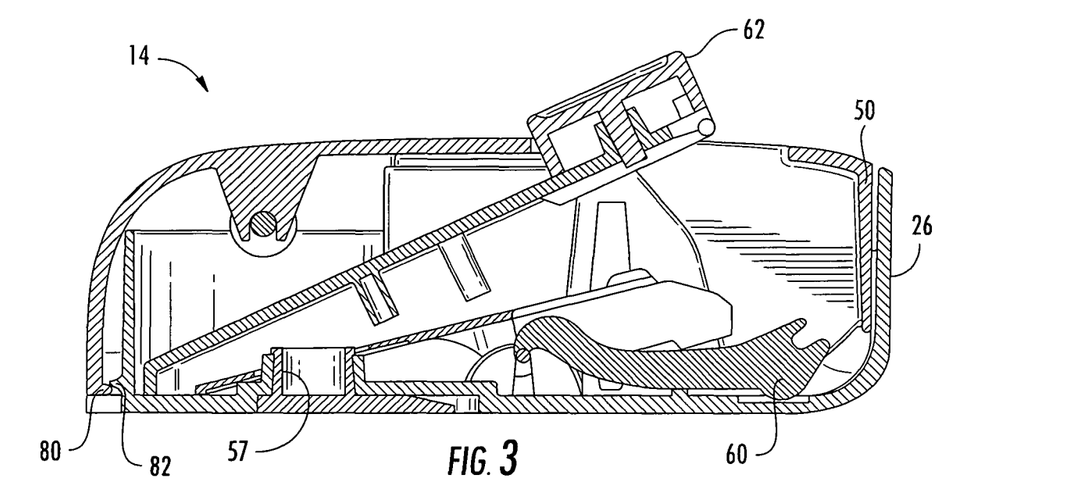
FIG. 3 is a side cross-sectional view taken through plane "B-B" of the rodent trap of FIG. 6 according to an exemplary embodiment of the invention.
Figure 6:
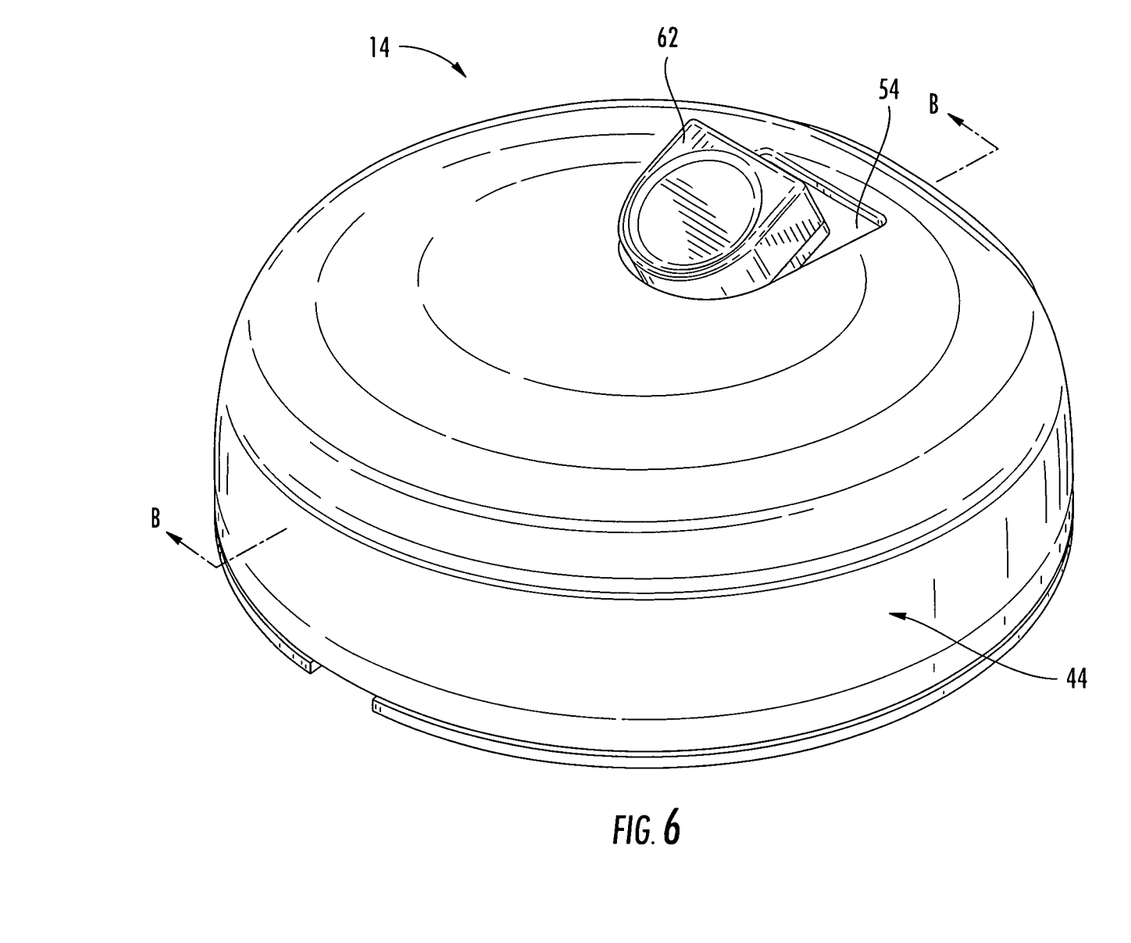
FIG. 6 is a top perspective view of a rodent trap in an "non-set" position according to an exemplary embodiment of the invention.

FIG. 3 shows a cross-sectional taken through plane "B-B" of the rodent trap 14 shown in FIG. 6 according to an embodiment of the invention. FIG. 3 shows trap in a "non-set" position. As shown, in embodiments of the invention, when the snap mechanism is activated and the first end of jaw 56 (left in the orientation shown) is lowered to trap a rodent, the second (e.g. right) end thereof is raised thereby forcing button 62 to protrude out of cutout 54. The button 62 provides a visible cue alerting a user to the fact that a rodent is trapped within the confines of the trap 14.

Figure 7:
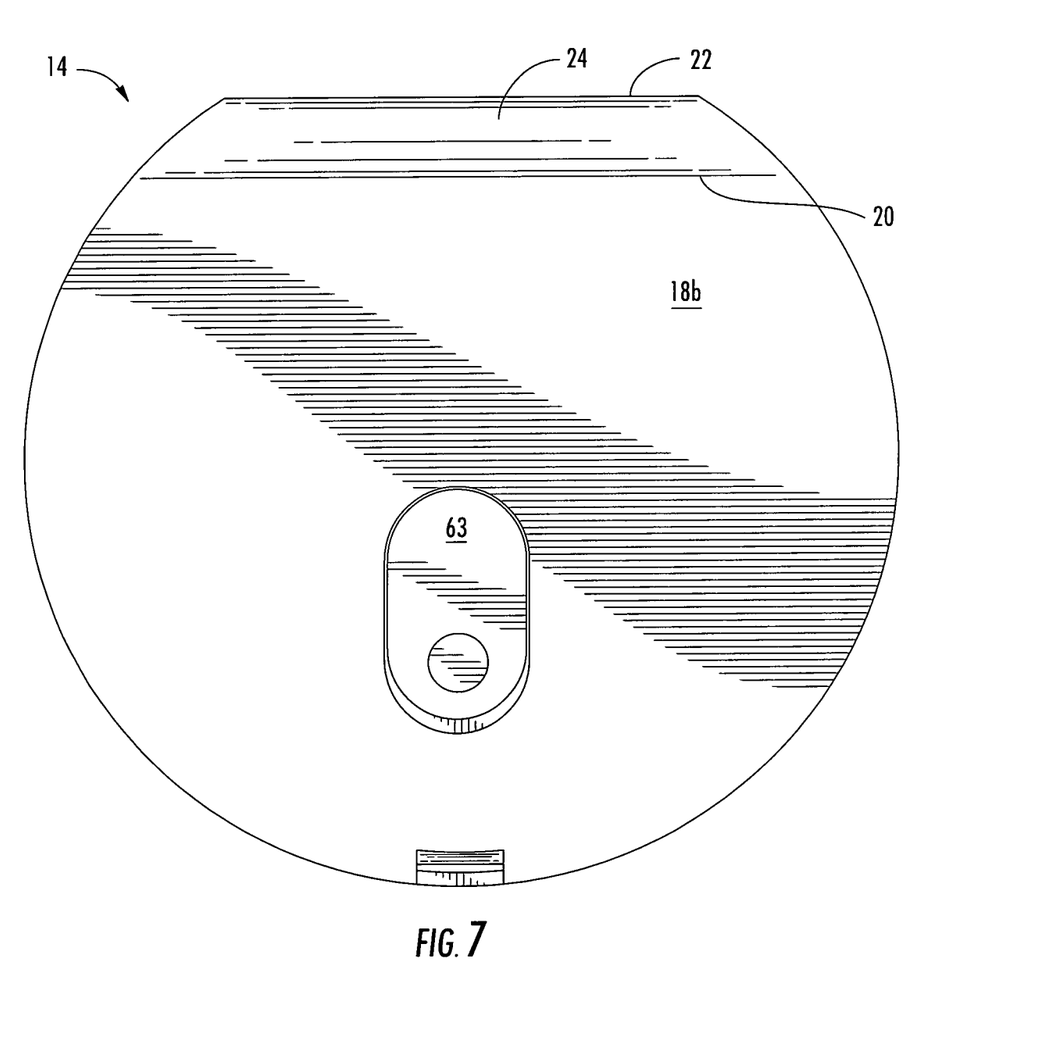
FIG. 7 is a bottom view of a rodent trap according to an exemplary embodiment of the invention.
Figure 8:
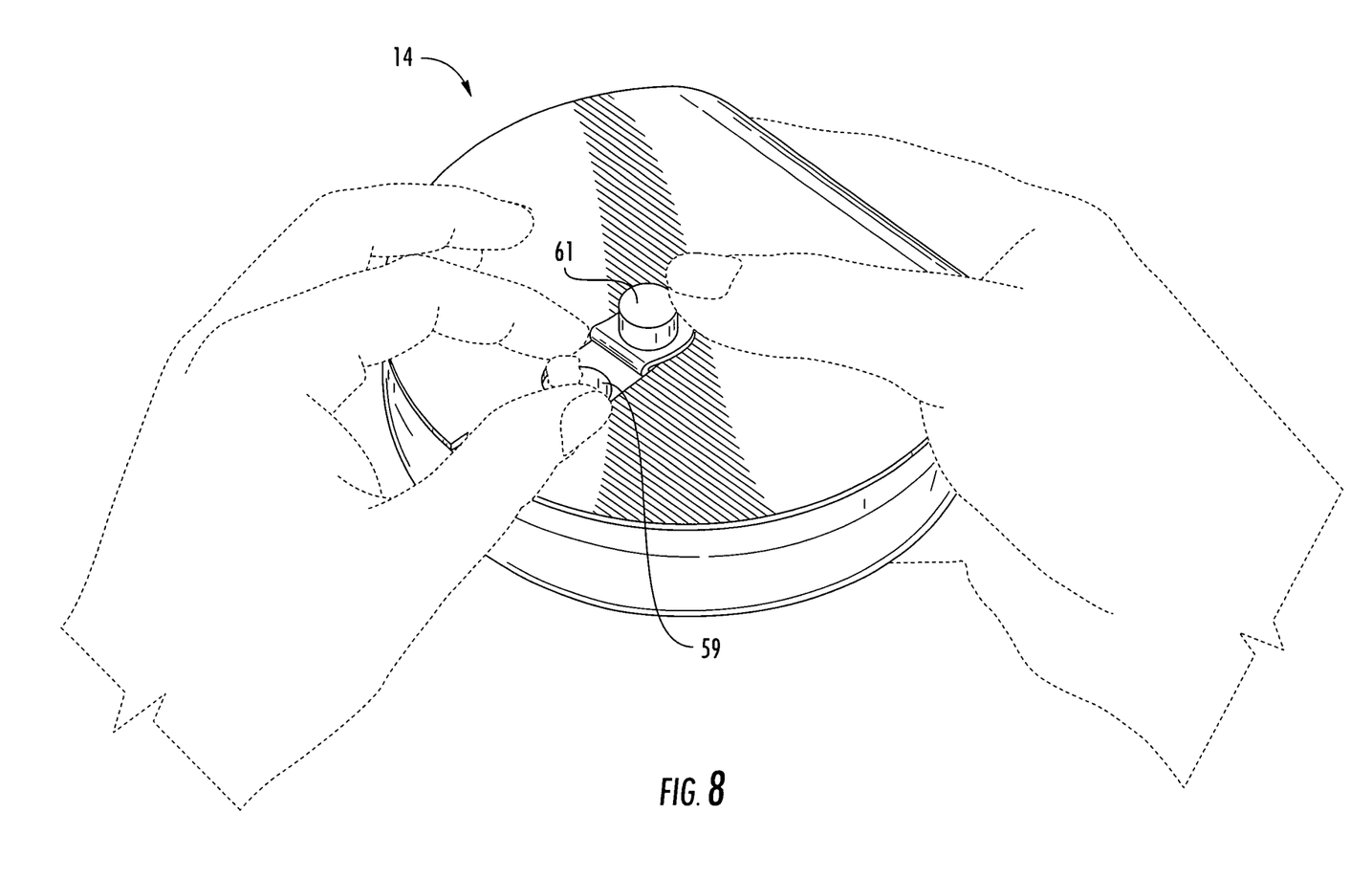
FIG. 8 is a bottom perspective view of a rodent trap in the process of being baited according to an exemplary embodiment of the invention.
Figure 9:
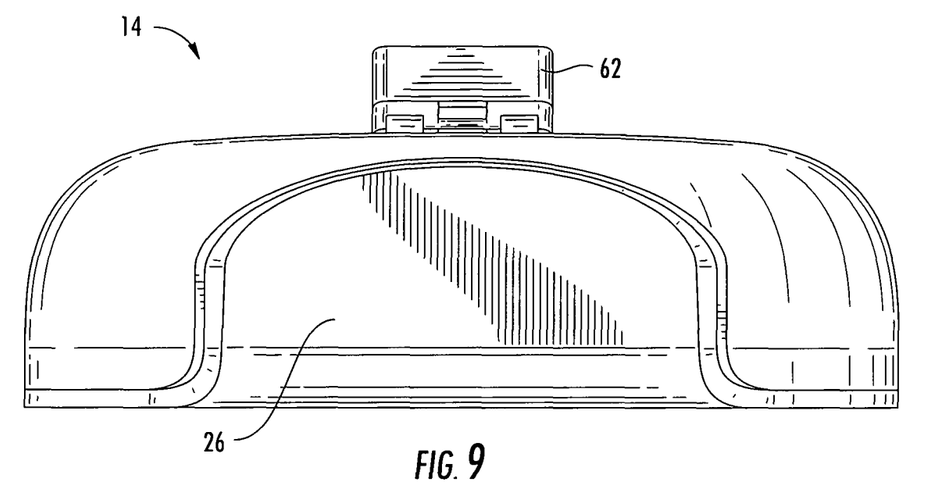
FIG. 9 is a front view of a rodent trap in an "non-set" position according to an exemplary embodiment of the invention.
Figure 10:
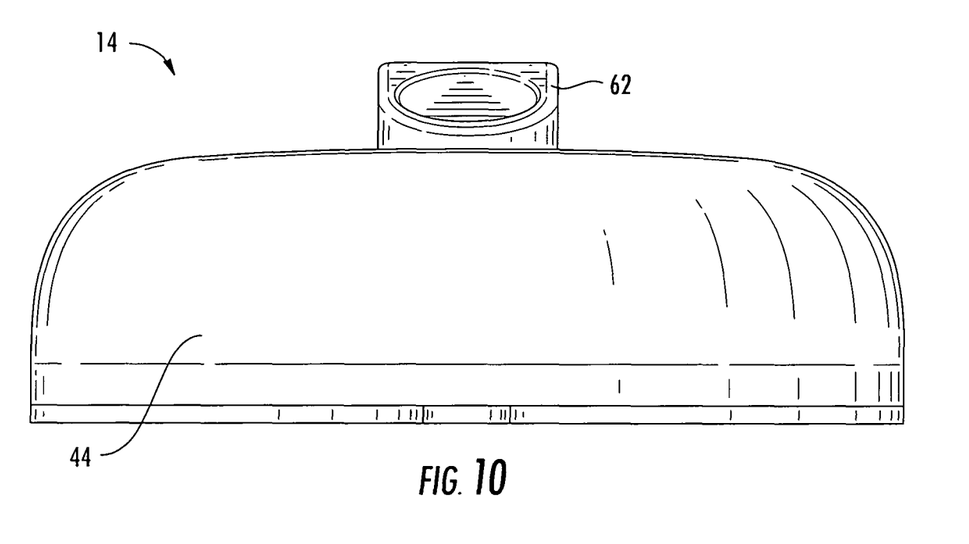
FIG. 10 is a rear view of a rodent trap in an "non-set" position according to an exemplary embodiment of the invention.

FIG. 7 shows the underside surface 18b of base plate 18 having a flexible panel 63 mounted thereto. Flexible panel has a first side that faces base plate 18 and a second side that faces the floor or other surface where the trap is deployed. In an embodiment, half of flexible panel is attached to underside 18b of base plate 18, whereas, the other half thereof is movable with respect to base plate 18. Plug 61 is positioned on the first side of flexible panel 63 and inserts into bait cup 57. With reference to FIG. 8, a user is shown baiting the trap according to an embodiment of the invention. As shown, a user overturns the trap in order to access panel 63. The user pulls the movable half of panel 63 to remove plug 61 from bait cup 57. The user then inserts bait (e.g. peanut butter) through exposed opening 59 and then reinserts the plug 61 into whole 59. As shown in FIGS. 2 and 3, bait cup 57 is positioned below trigger plate 58. A hole 59 (shown in FIG. 1) through trigger plate 58 provides access to the bait positioned therebelow.

Figure 11:
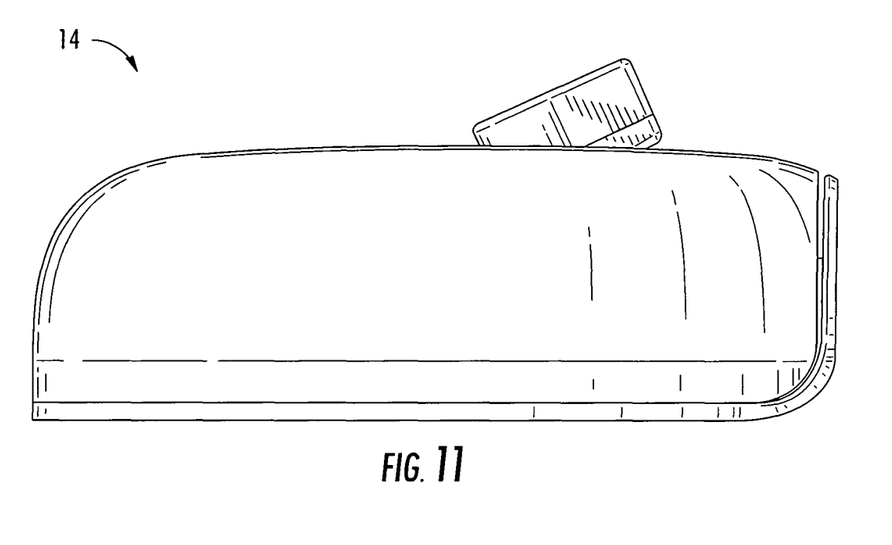
FIG. 11 is a side view of a rodent trap in an "non-set" position according to an exemplary embodiment of the invention.
Figure 12:
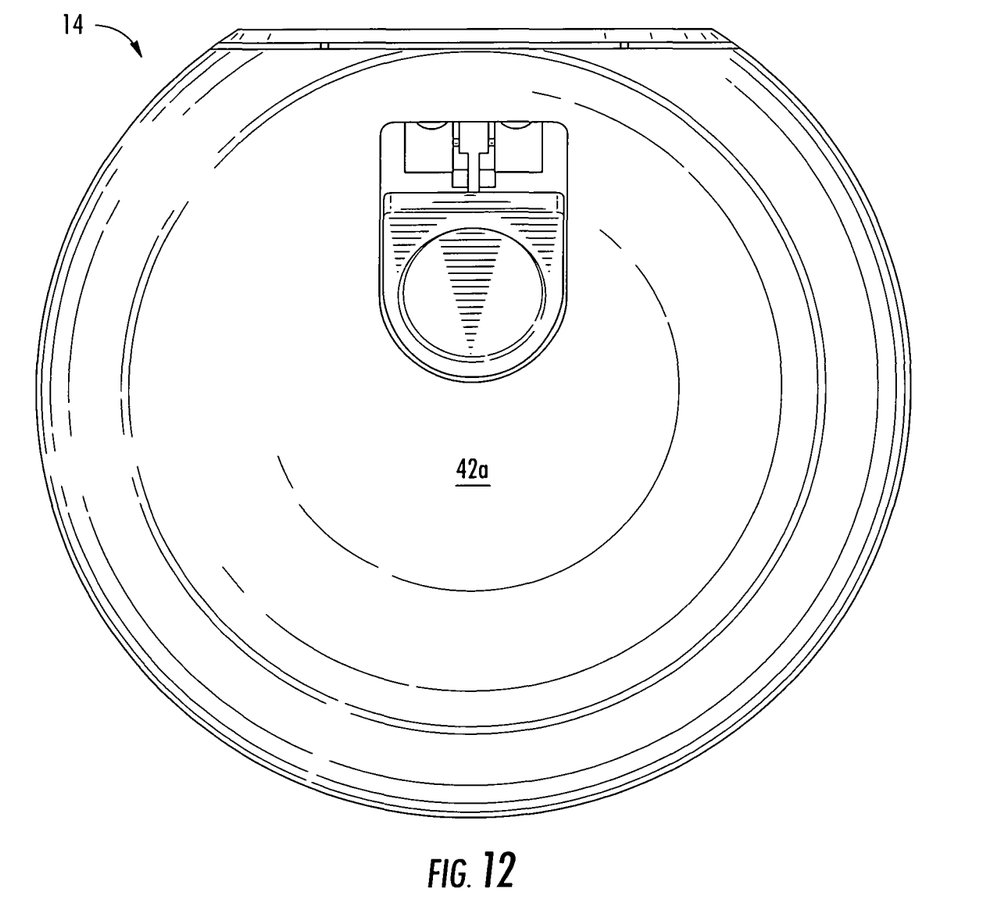
FIG. 12 is a top view of a rodent trap in an "non-set" position according to an exemplary embodiment of the invention.

Once the trap 14 is baited, a user needs to "set" it to be able to trap rodents. For example, FIG. 11 shows a rodent trap 14 that is in a non-set position. In order to make the trap 14 operational, the jaw 56 must be set in a configuration to be triggerable by a rodent. To that end, a user pushes down on the second end of jaw 56 to set the same. For example, pushing down on button 62 causes jaw 56 to pivot such that its second end is captured and maintained by pawl 60 and its first end (e.g. left) becomes raised. When first end of jaw 56 is raised, it pushes up on underside surface 42b of roof plate 42 and raises the dome 40. For example, FIG. 2 shows first end of jaw 56 contacting wheel 78, which is mounted to underside surface 42b. It will be understood that the first end of jaw may directly contact the underside surface 42b of roof plate 42, or it may indirectly contact the same through an intermediary structure (e.g. wheel 78 and post 52 as shown).

Figure 4:
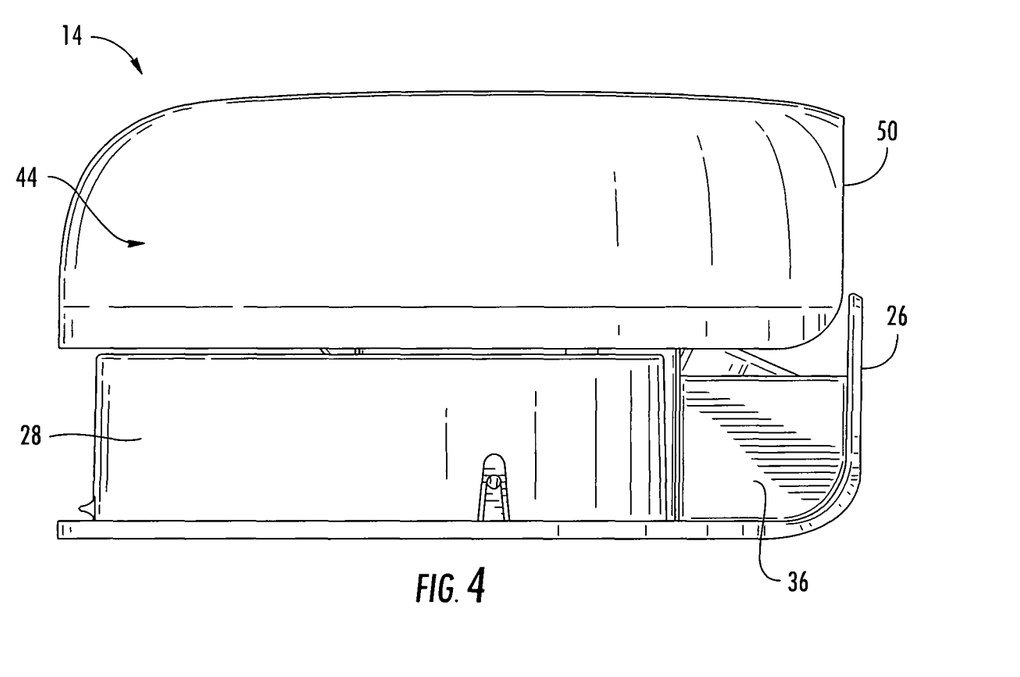
FIG. 4 is a side view of a rodent trap in a "set" position according to an exemplary embodiment of the invention.

With reference to FIG. 4, a user may place a set trap 14 with front flat wall 26 in contact with a wall of house or the like. In the set position, with dome 40 raised with respect to base member 16, openings 36 and 38 are exposed (only opening 36 shown in FIG. 4). Because opening 36 faces an opposite direction of opening 38, a rodent walking along a wall where set trap 14 is deployed may enter opening 36 if it comes from a first direction or it may enter through opening 38 if it comes from a second direction. A rodent enters into the trap 14 and walks to the bait cup 57, which contains a food or similar attractant. In embodiments of the invention, the bait cup 57 is situated in area substantially diametrically opposed to flat wall 26. As such, a rodent is required to walk into the far end of the trap 14 to reach the bait. In this regard, when the snap mechanism is activated, the entire rodent will be situated within the confines trap 14.

As stated, in embodiments of the invention, once the first end of jaw 56 is lowered to capture a rodent, the dome 40 resting on jaw 56 lowers onto base member 16 and the second end of jaw 56 becomes raised. In the lowered position, (for example, in reference to FIG. 6), dome 40 rests on peripheral area 30 of upper surface 18a of base plate 18. The second end of jaw 56 protrudes out of opening 54 in roof plate 42 of dome 40. Thus, in the lowered configuration, annular edge 44 surrounds rounded wall 28 and opening 36, 38 and flat wall 50 becomes substantially aligned with flat wall 26—thereby forming a closed container around a rodent captured therein.

In embodiments of the invention, a snap feature or similar connection mechanism secures dome 40 to base member 16 once dome 40 is lowered over base member 16. For example, FIG. 2 shows a projection 80 at a bottom segment of annular edge 44 of dome 40. Projection 80 is preferably formed integrally with dome 40 and it projects inward (i.e. toward the center of dome 40). Projection 80 inserts into a groove or slot formed on base member 16. For example, FIG. 2 shows a ledge 82 protruding from a lower segment of rounded wall 28. When a rodent is caught in the trap and dome 40 is lowered, a user need only apply downward force to the top of dome 40 to force projection 80 past ledge 82 (as shown in FIG. 3) to secure dome 40 to base member 16. This ensures that dome 40 does not accidentally retract during disposal or movement of the trap 14.

Having described this invention with regard to specific embodiments, it is to be understood that the description is not meant as a limitation since further modifications and variations may be apparent or may suggest themselves to those skilled in the art. It is intended that the present application cover all such modifications and variations.

What is claimed is:

1. A rodent trap, comprising:
   a base member comprising a base plate and an outer wall segment extending upwardly from the base plate;
   a dome member having a roof plate comprising an upper surface, an underside surface and an annular edge extending downward from the roof plate, the annular edge having an inner surface and an outer surface, the roof plate further comprising a cutout;
   the dome member being movably attached to the base member such that the dome member is movable in an upward direction to assume a raised position and is movable in a downward direction to assume a lowered position;
   a snap mechanism mounted to the base member, the snap mechanism comprising a jaw having a first end and a second end, the jaw being configured to assume a first position and a second position, whereby in the first position the first end of the jaw is raised with respect to the second end of the jaw and whereby in the second position the first end of the jaw is lowered with respect to the second end of the jaw;
   a trigger plate configured to maintain the jaw in the first position, the trigger plate triggerable by a rodent to cause the jaw to move into the second position;
   wherein when the jaw is in the first position, the dome member rests on the first end of the jaw and the second end of the jaw is positioned below the underside surface of the roof plate and surrounded by the inner surface of the annular edge, whereby the jaw is configured to move into the second position to snap down on the rodent and to also cause the dome member to be moved into the lowered position, wherein in the lowered position the second end of the jaw protrudes through the cutout in the roof plate such that a terminal end of the second end of the jaw is positioned above the upper surface of the roof plate and whereby in the second position, the inner surface of the annular edge of the dome member surrounds the outer wall segment of the base member.

2. The rodent trap of claim 1, wherein the base member has a first guide wall and a second guide wall, and wherein the dome member has a first guide wall and a second guide wall.

3. The rodent trap of claim 2, wherein the first and second guide walls of the base member contact the first and second guide walls of the dome member.

4. The rodent trap of claim 1, wherein the outer wall segment is a rounded wall having a first end and second end.

5. The rodent trap of claim 4, wherein the base member further comprises a flat wall extending upwardly from the base plate.

6. The rodent trap of claim 5, further comprising an ingress opening comprising a space between the first end of the rounded wall and the flat wall.

7. The rodent trap of claim 6, further comprising a second ingress opening comprising a space between the second end of the rounded wall and the flat wall.

8. The rodent trap of claim 1, wherein the first end of the jaw contacts a wheel disposed on the underside surface of the dome member.

9. A rodent trap, comprising:
   a base member comprising a base plate and an outer wall segment extending upwardly from the base plate;
   a dome member having a roof plate comprising an upper surface, an underside surface and an annular edge extending downward from the roof plate, the annular edge having an inner surface and an outer surface;
   the dome member being movably attached to the base member such that the dome member is movable in an upward direction to assume a raised position and is movable in a downward direction to assume a lowered position;
   a snap mechanism mounted to the base member, the snap mechanism comprising a jaw having a first end and a second end, the jaw being configured to assume a first position and a second position, whereby in the first position the first end of the jaw is raised with respect to the second end of the jaw and whereby in the second position the first end of the jaw is lowered with respect to the second end of the jaw;
   a trigger plate configured to maintain the jaw in the first position, the trigger plate triggerable by a rodent to cause the jaw to move into the second position;
   wherein when the jaw is in the first position, the dome member rests on the first end of the jaw, wherein the first end of the jaw contacts a wheel disposed on the underside surface of the dome member, whereby the jaw is configured to move into the second position to snap down on the rodent and to also cause the dome member to be moved into the lowered position, wherein in the lowered position the inner surface of the annular edge of the dome member surrounds the outer wall segment of the base member.

* * * * *